United States Patent
Wellinghoff et al.

(10) Patent No.: US 11,960,881 B2
(45) Date of Patent: Apr. 16, 2024

(54) SYSTEM AND METHOD FOR THE DELIVERY OF SOFTWARE DOCUMENTATION

(71) Applicant: Silicon Laboratories Inc., Austin, TX (US)

(72) Inventors: Nicholas Ryan Wellinghoff, Austin, TX (US); Stephen Hahn, Austin, TX (US); Yi-Yang Chen, Austin, TX (US); Bradford Stewart, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 126 days.

(21) Appl. No.: 16/751,257

(22) Filed: Jan. 24, 2020

(65) Prior Publication Data

US 2021/0232391 A1    Jul. 29, 2021

(51) Int. Cl.
*G06F 8/73*      (2018.01)
*G06F 16/13*     (2019.01)
*G06F 16/93*     (2019.01)
*G06F 40/106*    (2020.01)
*G06F 40/117*    (2020.01)
*G06F 40/166*    (2020.01)

(52) U.S. Cl.
CPC .............. *G06F 8/73* (2013.01); *G06F 16/137* (2019.01); *G06F 16/93* (2019.01); *G06F 40/106* (2020.01); *G06F 40/117* (2020.01); *G06F 40/166* (2020.01)

(58) Field of Classification Search
CPC .......... G06F 8/73; G06F 16/93; G06F 16/137; G06F 40/166; G06F 40/117; G06F 40/106

USPC .......................................................... 717/123
See application file for complete search history.

(56) References Cited

U.S. PATENT DOCUMENTS

| | | | | |
|---|---|---|---|---|
| 5,742,807 A * | 4/1998 | Masinter | ............ | G06F 16/9014 707/610 |
| 7,188,336 B2 * | 3/2007 | Humphries | ............... | G06F 8/73 717/101 |
| 7,568,184 B1 * | 7/2009 | Roth | ......... | G06F 8/74 717/123 |
| 9,092,575 B2 * | 7/2015 | Koenig | ............... | G06F 11/3668 |
| 10,733,000 B1 * | 8/2020 | Singh | .................. | G06F 3/04812 |
| 2014/0089898 A1 * | 3/2014 | Salapura | ........ | G06Q 10/063112 717/123 |
| 2018/0060067 A1 * | 3/2018 | He | ........ | G06F 11/3612 |
| 2019/0303541 A1 * | 10/2019 | Reddy | .................... | G06F 21/64 |
| 2019/0361721 A1 * | 11/2019 | Massoudi | ............. | H04L 9/3247 |
| 2020/0133661 A1 * | 4/2020 | Alexander | .......... | G06F 11/3684 |

(Continued)

*Primary Examiner* — Stephen S Hong
*Assistant Examiner* — Nicholas Hasty
(74) *Attorney, Agent, or Firm* — NIELDS, LEMACK & FRAME, LLC

(57) ABSTRACT

A system and method for simplifying the creation of documentation, and especially software documentation. A software application, referred to as a source metadata tagger and document compiler is used to add metadata to a final output document. This metadata contains identifiers that are associated with various source files. In this way, the system can easily determine which source file is being reviewed and/or flagged by the reviewer. This information can be used by the ticketing/notification system to create a work item for the appropriate developer or development group. This is vastly simpler than the current system, where human intervention is required to determine which source file is being flagged.

11 Claims, 11 Drawing Sheets

(56) References Cited

U.S. PATENT DOCUMENTS

2020/0183681 A1* 6/2020 Ramsl ..................... G06F 40/30
2020/0278861 A1* 9/2020 Chen ........................ G06F 8/73

* cited by examiner

BGXpressService.java

```
/**
 * Starts this service to perform action start Scan. If
 * the service is already performing a task this action will be queued.
 *
 * @param context  Interface to global information about an Android
 application environment.
 * @see IntentService
 */
public static void startActionStartScan(COntext context) {

Intent intent = new Intent(context, BGXpressService.class);
    intent.setAction(ACTION_START_SCAN);
    context.startService(intent);
}
```

400 encompasses the comment block and method; 410 encompasses the method body.

FIG. 4A

```xml
<?xml version="1.0" encoding="UTF-8"?>
<memberdef kind="function"
id="classcom_1_1silabs_1_1bgxcommander_1_1_b_g_xpress_service_1a264126722a02481b99613921e89bd8d5"
prot="public" static="yes" const="no" explicit="no" inline="yes" virt="non-virtual">
    <type>void</type>
    <definition>static void com.silabs.bgxcommander.BGXpressService.startActionStartScan</definition>
    <argsstring>(Context context)</argsstring>
    <name>startActionStartScan</name>
    <param>
        <type>Context</type>
        <declname>context</declname>
    </param>
    <briefdescription>
        <para>Starts this service to perform action Start Scan.</para>
    </briefdescription>
    <detaileddescription>
        <para>If the service is already performing a task this action will be queued.</para>
        <para>
            <parameterlist kind="param">
                <parameteritem>
                    <parameternamelist>
                        <parametername>context</parametername>
                    </parameternamelist>
                    <parameterdescription>
                        <para>Interface to global information about an android application environment.</para>
                    </parameterdescription>
                </parameteritem>
            </parameterlist>
            <simplesect kind="see">
                <para>IntentService</para>
            </simplesect>
        </para>
    </detaileddescription>
    <inbodydescription/>
    <location file="https://github.com/myrepo/...BGExpressService.java" line="1445" column="1"
bodystart="1455" bodyend="1460"/>
</memberdef>
```

FIG. 4B

```
Changelog.md

Changelog

[1.0] - 2017-06-20

Added
- New feature 1
- New feature 2
- New feature 3

Changed
- Changed feature 1
- Changed feature 2
- Changed feature 3

Removed
- Removed Feature 1
```

FIG. 5

```html
<div data-docmeta="ada59bbe-5ef7-4a43-9852-9ac239bb007f" data-v-5f9918f6="" data-v-7a5c3414="">
<div data-v-5f9918f6="" data-v-4bc9c6de="">
   <p data-v-5f9918f6="" data-v-4bc9c6de="">Starts this service to perform action Start Scan.
     </p>
</div>
<div data-v-11d19036="" data-v-5f9918f6="">
   <h6 data-v-11d19036="">
     Parameters
   </h6>
   <table data-v-11d19036="">
      <tbody data-v-11d19036="">
         <tr data-v-11d19036="">
            <td data-v-11d19036="">
              context
            </td>
            <td data-v-11d19036="">
               <div data-v-11d19036="" data-v-4bc9c6de="">
                  <p data-v-11d19036="" data-v-4bc9c6de="">Interface to global information about
   an Android application environment. </p>
               </div>
            </td>
         </tr>
      </tbody>
   </table>
</div>
<div data-v-5f9918f6="" data-v-4bc9c6de="">
   <p data-v-5f9918f6="" data-v-4bc9c6de="">If the service is already performing a task this
     action will be queued.</p>
   <h6 data-v-5f9918f6="" data-v-4bc9c6de="">See Also</h6>
   <ul data-v-d6fb9a26="" data-v-5f9918f6="">data-v-4bc9c6de="">
      <li data-v-d6fb9a26="">
         <p data-v-d6fb9a26="" data-v-627fb90a="">IntentService </p>
      </li>
   </ul>
</div>
<br data-v-5f9918f6="">
<div data-v-29931464="" data-v-5f9918f6="">

</div>
 <br data-v-5f9918f6="">
</div>

<h1 data-docmeta="38208655-881e-44dd-bbe2-8930500e177b" data-v-5ca27558="" data-v-
 499fe89b="">Changelog</h1>

<h2  data-v-5ca27558="" data-v-499fe89b="">
       <!----> - 2017-06-20
   </h2>
   <h3  data-v-5ca27558="" data-v-499fe89b="">Added</h3>
   <ul  data-v-d6fb9a26="" data-v-5ca27558="">
      <li data-v-d6fb9a26="">
         <p  data-v-d6fb9a26="" data-v-627fb90a="">New feature 1</p>
      </li>
      <li data-v-d6fb9a26="">
         <p  data-v-d6fb9a26="" data-v-627fb90a="">New feature 2</p>
      </li>
      <li data-v-d6fb9a26="">
         <p  data-v-d6fb9a26="" data-v-627fb90a="">New feature 3</p>
      </li>
   </ul>
```

FIG. 6 docs.silabs.com

Overview

Zeds2 is based on some of the same concepts as Zeds v1. with v only be accomplished if we adopt a standard that every team men Report Zeds2 Goals:

1. Reduce the number of sources of truth for a docset
2. Help reduce friction in publishing needs where change can ha
3. Simplify the current rendering and piblishing process

FIG. 9

Report issue ✕

Change to 'ZEDS2 Goals:'

Cancel   OK

FIG. 10

```
{
    "type": "page,
"children": [
  ...
  {
    "type": "heading"
    "position": {
      "column": 1,
      "line": 7
    },
    "id": "b7421625-3bf8-436d-8214-c79d910f9ee5",
    "children": [
      {
        "position": {
          "column": 4,
          "line": 7
        },
        "type": "text",
        "value": "Zeds2 Goals:"
      }
    ],
    "depth": 2,
  },
  ...
]
```

FIG. 11

SYSTEM AND METHOD FOR THE DELIVERY OF SOFTWARE DOCUMENTATION

FIELD

This disclosure describes systems and methods for the delivery of software documentation from disparate data sources.

BACKGROUND

Modern software documentation is aggregated and compiled using content from multiple data sources using complex automated software release processes. In other words, the content may be embedded in various pieces of software, which are all incorporated into the final document. During development and after delivery, it is often necessary to review the document for accuracy, completeness, grammatical errors and the like. Currently, the system for providing feedback and quality assurance on the final document is often manual, error prone and relies on human research to discover the original source of a particular piece of content in the final document.

For example, the user is often viewing the final document. As stated above, the document was created using content embedded in various pieces of software. The information about the original source of each piece of content of the final document is lost during the compilation process and therefore any attempt to automate reporting issues against the original source is not possible.

Therefore, existing techniques rely on manual processes or at best include screen shots that allow a dispatcher to determine how to properly report an issue to the correct team for resolution. No information about where the content in question was derived from is included in the document the end user is interacting with. This results in a feedback loop that has many manual blocks that rely on an intermediary to correlate information and advance it to the next step. Existing techniques are slow, each person that is introduced into the process creates a potential for a block or introduction of an error.

Therefore, it would be beneficial if there were a system and method that could automate this process. Further, it would be advantageous if this system was easy to implement for the software developers and allows automatic routing of issues to the correct team for resolution.

SUMMARY

A system and method for simplifying the creation of documentation, and especially software documentation. A software application, referred to as a source metadata tagger and document compiler is used to add metadata to a final output document. This metadata contains identifiers that are associated with various source files. In this way, the system can easily determine which source file is being reviewed and/or flagged by the reviewer. This information can be used by the ticketing/notification system to create a work item for the appropriate developer or development group. This is vastly simpler than the current system, where human intervention is required to determine which source file is being flagged.

According to one embodiment, a system for creating a documentation set is disclosed. The system comprises one or more software or documentation repositories; a build system to identify source files in the one or more software or documentation repositories to be included in the documentation set; and a source metadata tagger and document compiler to create a final output document, wherein the source metadata tagger and document compiler inserts metadata into the final output document, the metadata indicative of a location of each source file used to create the final output document. In certain embodiments, the metadata comprises a hash of the location of each source file. In some embodiments, the system further comprises a metadata tracking server, the metadata tracking server comprises a database comprising each hash and a location of the source file associated with the hash. In certain embodiments, the database includes a name of a responsible person associated with each source file. In some embodiments, the metadata is inserted at the start of content from each source file in the final output document. In some embodiments, the system further comprises an application widget that is embedded in a viewable version of the final output document. In some embodiments, the application widget allows a reviewer to highlight a section of the viewable version and to input a comment. In certain embodiments, the application widget posts data to an Action Broker application, and the Action Broker application creates a work ticket associated with the comment. In some embodiments, a responsible person is identified in the work ticket.

According to another embodiment, a method of creating a documentation set is disclosed. The method comprises collecting source files having documentation from a plurality of disparate sources; and compiling the source files into a final output document, wherein metadata is inserted into the final output document, the metadata indicative of a location of each source file used to create the final output document. In certain embodiments, the metadata comprises a hash of the location of each source file. In some embodiments, the method further comprises creating a database that correlates the hash with the location of each source file. In certain embodiments, the database includes a name of a responsible person associated with each source file. In some embodiments, the metadata is inserted at the start of content from each source file in the final output document. In some embodiments, the method further comprises creating a viewable version of the final output document; and allowing a reviewer to highlight a section of the viewable version and to input a comment. In certain embodiments, the method further comprises creating a work ticket based on the comment, the work ticket containing the location of the source file that is being highlighted. In some embodiments, the work ticket is forwarded to a responsible person.

BRIEF DESCRIPTION OF THE DRAWINGS

For a better understanding of the present disclosure, reference is made to the accompanying drawings, in which like elements are referenced with like numerals, and in which:

FIGS. 4A-4B shows the conversion of a java file;

FIG. 5 shows a markdown file;

FIG. 6 shows an example final output document in HTML format that combines the java file and the markdown file according to one embodiment;

FIG. 9 shows a representative final output document with an error;

FIG. 10 shows a dialog box created by the widget; and

FIG. 11 shows final output document used in the example of FIGS. 9-10.

DETAILED DESCRIPTION

Figure 1:
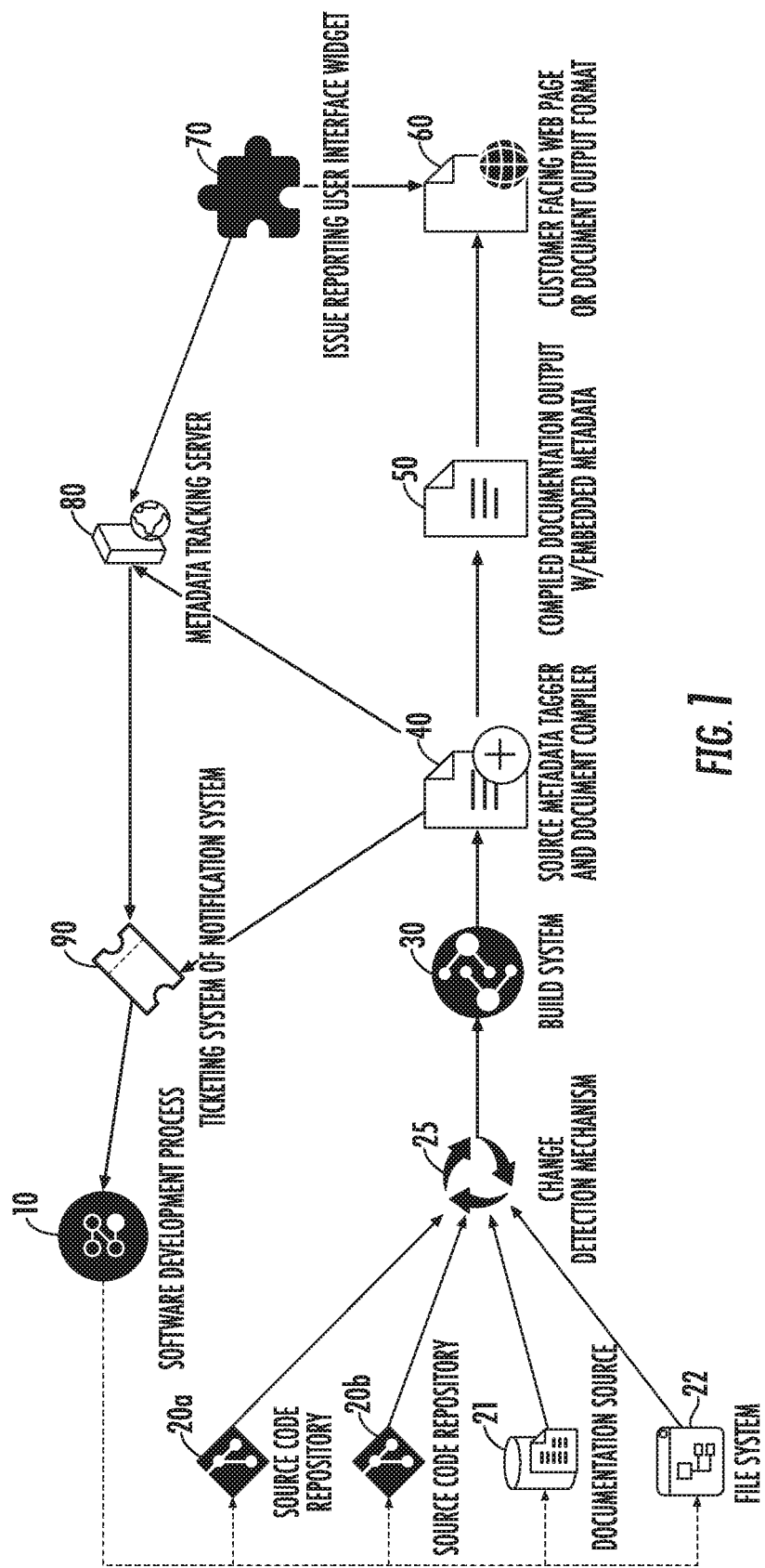
FIG. 1 is a block diagram showing the flow of information according to one embodiment.

FIG. 1 shows a block diagram showing the flow of information according to one embodiment.

The flow of information begins with the software development process 10. Software developers produce software, which may be stored in source code repositories 20a, 20b. Embedded in this source code may be comments, which are extracted later in the process to create the software documentation.

In addition to the comments that are embedded in the software, there may be additional documentation that is stored in documentation sources 21. Additionally, documentation may be saved in the file system 22.

In other words, there are many potential sources of documentation material, such as source code repositories, documentation sources or directly from the file system. The present system accepts documentation from any of these sources.

As is traditionally done, the system includes a change detection mechanism 25. This change detection mechanism 25 monitors each source file that is part of the build process. This may be performed by monitoring the file system to detect a change in the modification date or time of a source file. Any change in a source file may trigger a new build. Once triggered by the change detection mechanism, the build system 30 collects the latest version of each source file from the source code repositories 20a, 20b and the documentation sources 21. The build process consists of build steps that have contextual awareness of the original source files being processed. In other words, the build system 30 is aware of the source files that are being used and the order in which they are aggregated to create the final output document 50.

Advantageously, a source metadata tagger and document compiler 40 is disposed in the information flow. The source metadata tagger and document compiler 40 can be loaded into any standard build system or continuous integration tool such as Ant, Maven, Gradle, NPM, Jenkins or others. Once the build systems internal mechanism identifies a file containing documentation has changed, it will launch the source metadata tagger and document compiler 40. The source metadata tagger and document compiler 40 is responsible for creating an identifier for each source file and inserting that identifier into the final output document 50. In this way, the final output document 50 preserves the information regarding the source file from which each segment of the final output document 50 was derived.

The build system 30 and the source metadata tagger and document compiler 40 are responsible for taking the documentation text from the source code repositories 20a, 20b and multiple documentation sources 21 and aggregating these disparate source files into a final output document 50. The source metadata tagger and document compiler 40 is responsible for inserting metadata into a documentation artifact that tracks the location of the source file. For example, API documentation is often stored using an annotation standard that is attached to a function or logical section of a source code file, such as is shown in FIG. 4A. A build system 30 then aggregates these annotations and outputs a document or intermediary artifact that is included in a larger document. The source metadata tagger and document compiler 40 inserts an identifier into this intermediary or final output format such that the location of the original source file of the information is preserved. Examples of this process are shown in greater detail below.

This final output document 50 may be navigable and readable via a web browser. In other embodiments, the final output document 50 is navigable and readable via document rendering software, such as a PDF viewer, Amazon eBook, Kindle reader or other suitable viewer.

The source metadata tagger and document compiler 40 integrates with common documentation standards, such as API annotation standards, Markup, Doxygen and others.

The source metadata tagger and document compiler 40 may also interact with the ticketing/notification system 90. Specifically, after a build, a new final output document 50 has been created. The source metadata tagger and document compiler 40 informs the ticketing/notification system 90 that a new build has occurred. The source metadata tagger and document compiler 40 may also provide to the ticketing/notification system 90 a list of the source files that have been changed since the last build. In response, the ticketing/notification system 90 may create work items or tickets. These tickets may have a direct link, such as a hyperlink, to the specific page or pages of the final output document 50 that have been changed so that the reviewer can view the document in its final form and evaluate it. In this scenario, the reviewer may be the software developer or a quality assurance engineer.

In other words, the process of detecting changes to the build and creating work items to review these changes is automated. This ensures that a documentation change cannot be made without the creation of a corresponding work item to review the change after the new source file has been incorporated into the final output document 50.

The ticketing/notification system 90 is not limited by this disclosure. Commercially available applications, such as Jira, Github and email may be used to implement the ticketing/notification system 90.

The identifier that is produced by the source metadata tagger and document compiler 40 may be created in a variety of ways. In one embodiment, the source metadata tagger and document compiler creates the identifier using a one-way hash function. The input to this one-way hash function may be a block of text that includes, for example, the source file name, the source code repository URL, the project name, responsible person (such as the engineer or technical writer), or other attributes. In another embodiment, the source metadata tagger and document compiler 40 creates a unique value to use for each source file. These schemes allow the names and locations of the source files to remain proprietary. In other embodiments where confidentiality is not important, the source metadata tagger and document compiler 40 may use the actual source file name and location as the identifier.

However created, the source metadata tagger and document compiler 40 then stores the identifier in the metadata tracking server 80. The identifier is stored in the metadata tracking server 80 with additional information, such as the source file name, source file repository, project name, the responsible person (such as the engineer or technical writer), tracking system identifier, and other attributes. This information may be stored in a database. This database may be in table format, or some other suitable format. The tracking system identifier is a unique identifier that a ticketing system, such as JIRA, assigns to an item such that the item can be looked up and retrieved later. In this way, the final output document 50 may not contain the actual names and locations of the files, but that information is still available via the metadata tracking server 80.

As noted above, as the final output document 50 is being aggregated from the disparate source files, the source metadata tagger and document compiler 40 inserts the identifiers. An identifier may be inserted at the start of the content from a particular source file, such that the information that follows that identifier is known to be from that particular source file.

In certain embodiments, the source metadata tagger and document compiler 40 may insert additional metadata for increased granularity. For example, in certain embodiments, metadata may be inserted that denotes the location of the source file and the associated page number or line number.

The source metadata tagger and document compiler 40 provides information to the metadata tracking server 80 that includes the identifier and attributes associated with that identifier. In this way, the metadata tracking server 80 also serves as a privacy layer, obfuscating any internal proprietary information such as repository URLs, project names, etc. from public viewing. The final output document 50 only contains an identifier used to lookup metadata via the metadata tracking server 80.

In some embodiments, the metadata tracking server 80 also provides advanced functionality that allows customization of the user experience and control of the information provided to the user interface widget 70.

Specifically, a user interface widget 70 may be injected into the final output document 50 to create the viewable document 60. This user interface widget 70 is an application, written in a web browser supported programming language that outputs javascript, CSS and/or HTML. The user interface widget 70 allows an end user to provide direct feedback on the final output document 50. This may be achieved by allowing the user to select an area of the viewable document 60 to review. The user interface widget 70 then interacts with the metadata tracking server 80 to allow the user to provide feedback to the developers.

The metadata tracking server 80 then forwards this information to the ticketing/notification system 90, which creates a work ticket. That work ticket identifies the actual source file that is being reviewed and other pertinent information. Thus, a complete feedback loop is created that does not require any human intervention. Rather, by knowing which source file is being flagged, it is possible to create work items and route them appropriately without any operator aid.

The components above, such as the build system 30, the change detection mechanism 25, the ticketing/notification system 90, the source metadata tagger and document compiler 40, the user interface widget 70, and the metadata tracking server 80 are each software applications. As such, each component comprises a plurality of instructions, which when executed by a processing unit, enable the processing unit to perform the functions associated with that component. These instructions may be stored on a non-transitory computer readable storage medium, such as a volatile memory device, or a non-volatile memory device. Non-volatile memory devices include CDROMs, hard disks, optical disks, read only memory and the like. Volatile memory devices include RAM, DRAM, cache memory and the like. In certain embodiments, all of the components listed above may be present on a single processing unit. However, in other embodiments, these components may be distributed on multiple processing units. For example, the user interface widget 70 is embedded in the viewable document 60, which may be disposed on a customer's computer. In contrast, the build system 30, the change detection mechanism 25, the ticketing/notification system 90, the source metadata tagger and document compiler 40 and the metadata tracking server 80 may be disposed at the software supplier's facility.

Some of the components described herein, such as the build system 30, the change detection mechanism 25, and the ticketing/notification system 90 may be commercially available systems.

The novel components, which include the source metadata tagger and document compiler 40, the metadata tracking server 80 and the user interface widget 70, are described in more detail below.

Figure 2:
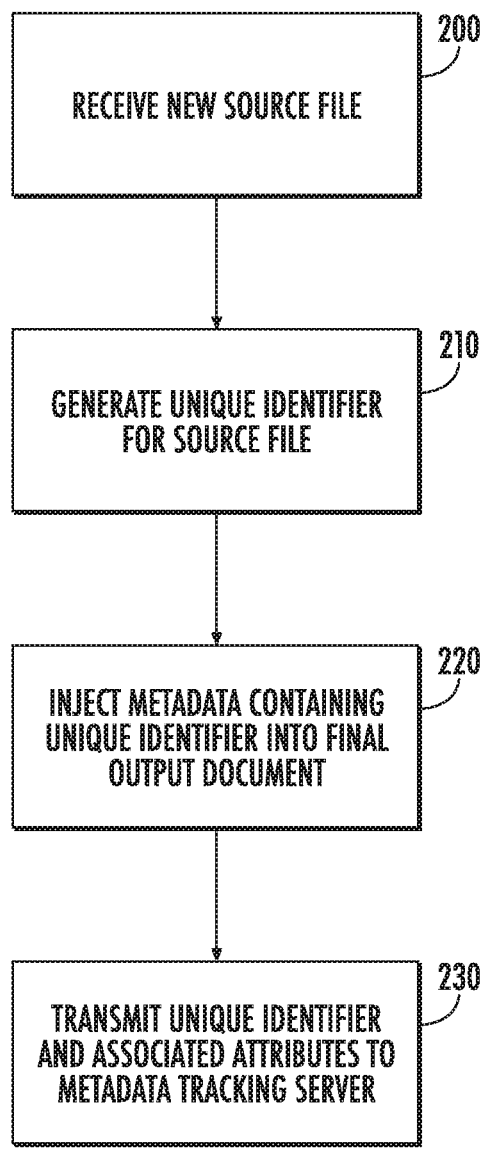
FIG. 2 shows the operation of the source metadata tagger and document compiler according to one embodiment.

The source metadata tagger and document compiler 40 is responsible for inserting metadata into the final output document 50. The sequence that is executed by the source metadata tagger and document compiler 40 during a build is shown in FIG. 2. First, as shown in Box 200, a new source file is presented to the source metadata tagger and document compiler 40. This source file contains documentation that is to be aggregated into the final output document 50. The source metadata tagger and document compiler 40 then creates a unique identifier that is associated with this source file, as shown in Box 210. The source metadata tagger and document compiler 40 then inserts this identifier into the final output document 50, as shown in Box 220. The source metadata tagger and document compiler 40 then transmits the new identifier, along with the attributes associated with this identifier, to the metadata tracking server 80, as shown in Box 230. These attributes may include the source file name, source file path, storage location, tracking identifier and other information. Note that Box 220 and Box 230 may be performed in the opposite order. Note that the sequence shown in FIG. 2 repeats for each new source file that is part of the build process. This iterative process results in the final output document 50.

Figure 3:
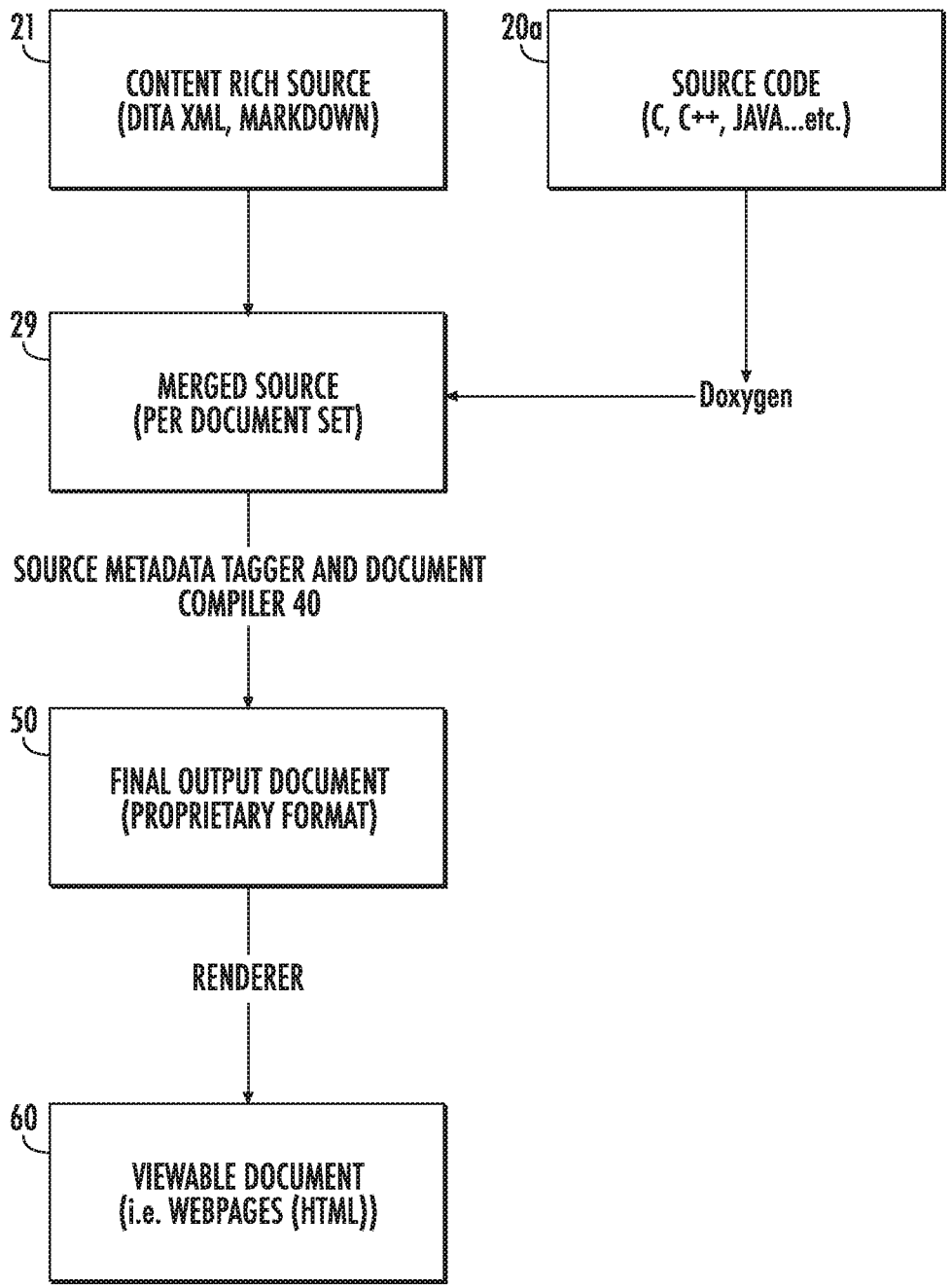
FIG. 3 shows the various file types that may be used.

The operation of the system is described in more detail below. FIG. 3 shows the various file types that may be used and created during the process shown in FIG. 1. First, content rich files, which may be stored in documentation sources 21, may be written in DITA XML, Markdown or another suitable language. Additionally, comments may be contained in the source code, which may be stored in source code repository 20a. This source code may be written in C, C++, Java or any other suitable language.

In certain embodiments, an application documentation framework, such as Doxygen, may be used to extract the documentation content from the source code and save this documentation. The output of the application documentation framework maybe an XML file, although other formats may be created.

In certain embodiments, a merged source 29 is created. This merged source 29 comprises all of the files in the documentation set (in their various formats). These files may be stored in a single directory. The directory may also include a configuration file, which stores the source file location for all elements in the documentation set. This configuration file may be in any suitable format, such as YAML.

In certain embodiments, this merged source 29 is not created. Rather, the system omits this step and moves directly to the next step.

All of the files that are part of this documentation set are then compiled. The output from the source metadata tagger and document compiler 40 may be in a propriety format that unifies the various documentation types and their menu systems into a common format. Based on the configuration file defined in the merged source 29, the compiler may choose the appropriate loader and transformer to transform Markdown, Doxygen XML, and DITA XML files into object pages. Also, the menus of each source file may be merged according to configuration file. In other embodiments, the selection of the appropriate loader and transformer may be performed in a different manner.

In order to create a traceable path back to the location of the original source code, the source metadata tagger and document compiler creates a unique hash for each class member element and includes it in the generated output. Additionally, the Doxygen XML output file (which was generated from the source code files) may provide location information about the original source code. This location information is saved along with the hash.

Next, the proprietary file format is passed through a renderer that transforms the proprietary file format to a viewable document 60. This viewable document may be in HTML format. Of course, it may be in another format, such as PDF or Reader. For example, a plurality of web pages may be generated. The generated hash and location metadata are propagated to the viewable document.

Having described the file types that are used, examples showing the transformation of two different file types are described below. FIG. 4A-4B shows the conversion of a java file to extract only the documentation, while FIG. 5 shows a Markdown file.

FIG. 4A shows a simple java program. This java includes api documentation 400 and code 410. As explained above, only the api documentation are used in the system and process shown in FIG. 1.

As explained in FIG. 3, Doxygen, or another similar program, may be used to extract the comments from source code and create an XML file. FIG. 4B shows the XML file created by Doxygen for the source code of FIG. 4A. Note that Doxygen includes the location of the source code in the XML. In this example, the location of the original source code is found at the end of the XML file.

This XML is then converted to a proprietary file format (not shown). The proprietary file format may include the actual location of the source code, or may include the hash.

FIG. 5 shows a simple Markdown file. This Markdown file is then converted to a proprietary file format (not shown). The proprietary file format may include the actual location of the source code, or may include the hash.

Finally, that proprietary file format is rendered as a viewable document, such as HTML pages. FIG. 6 shows the rendered HTML output that includes both the documentation from the java file and the Markdown file. In this example, the documentation from the java file appears first, followed by the Markdown file.

Note that the location of the java file, which was included in the XML file of FIG. 4B, has been removed and replaced with a hash:

<div data-docmeta="ada59bbe-5ef7-4a43-9852-9ac239bb007f" data-v-5f9918f6="" "data-v-7a5c3414="">

This hash is also saved in the metadata tracking server 80, along with the location of the file, which is found in the XML file: "https://github.com/myrepo/ . . . /BGXpressService.java".

Similarly, the location of the source file for the Markdown file has been replaced with metadata, such as:

<h1 data-docmeta="3820865-881e-44dd-bbe2-8930500e177b" data-v-5ca27558="" "data-v-499fe89b="">Changelog</h1>

Again, this hash is also saved in the metadata tracking server 80, along with the location of the file.

Thus, the final HTML output removes all information about the location of the source files, but includes hashes that allow the document creator to determine the source file.

Having described the source metadata tagger and document compiler 40, the other novel components will be described.

Figure 7:
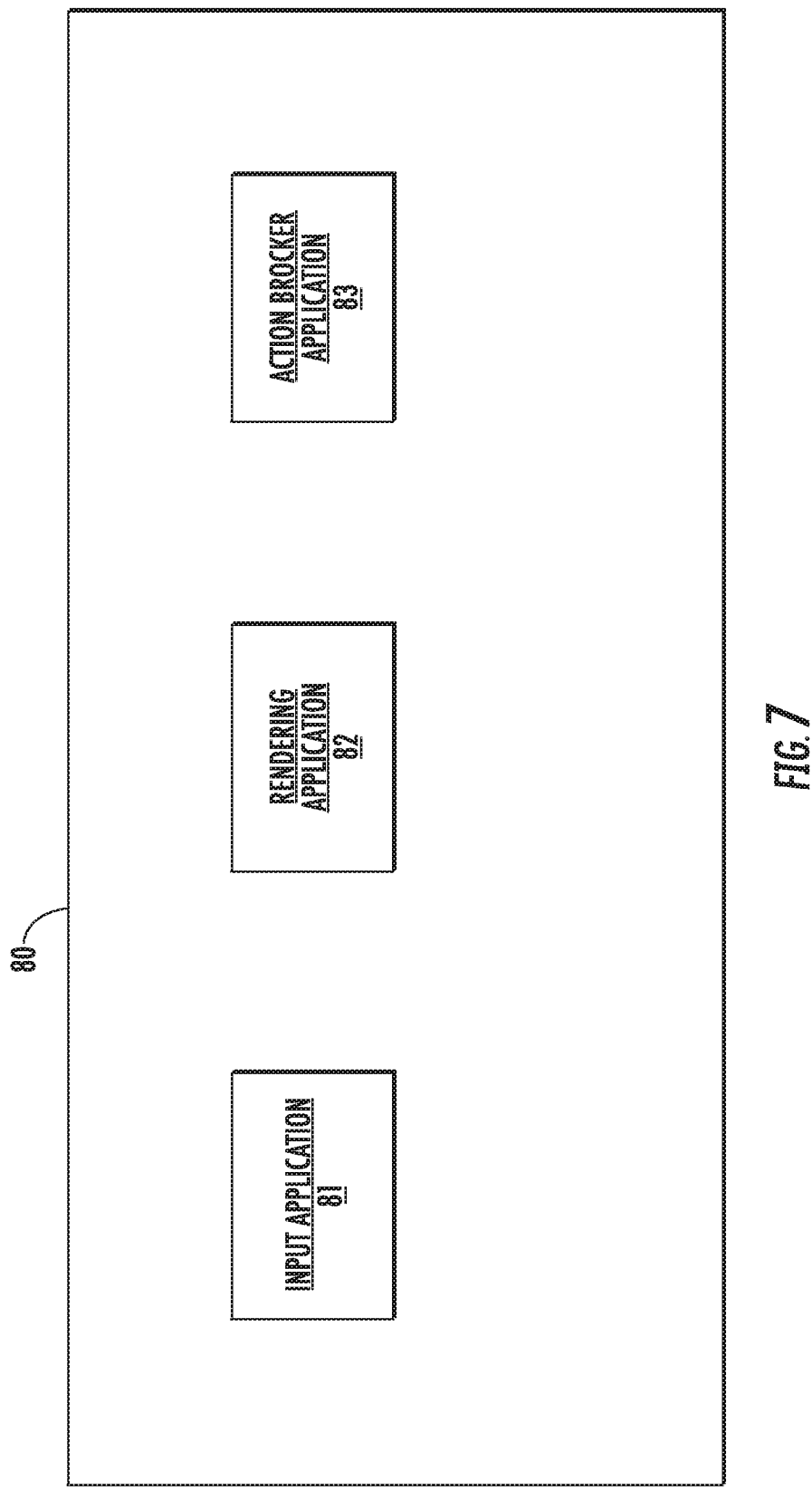
FIG. 7 shows the structure of the metadata tracking server.

FIG. 7 shows the structure of the metadata tracking server 80. The metadata tracking server 80 has three elements; an input application 81, a rendering application 82, and an action broker application 83.

The input application 81 receives the unique identifier and the attributes as inputs from the source metadata tagger and document compiler 40. The input application 81 then stores this information for future use. This information may be stored as a database, a table or any other suitable format. The input to the input application 81 from the source metadata tagger and document compiler 40 may be in any suitable format, such as JSON or XML.

The rendering application 82 interfaces with the user interface widget 70. When the user interface widget 70 initiates a feedback action, the rendering application responds with a rendering payload that populates the user interface widget with a custom user interface. In other words, the response from the rendering application 82 to the user interface widget 70 is an executable file that creates a custom user interface. This custom user interface may be configured to give different responses based on the type of user and their operating environment. For example, a quality assurance engineer would receive an interface with details specific and internal to the company. These details may include a project tracking system link, information about the developers, existing bug reports about the item, and others. An end user or customer would receive a simpler interface that prompts them for feedback and allows them to highlight particular passages in the viewable document 60 to indicate what their feedback is referring to.

The action broker application 83 interfaces with the ticketing/notification system 90. The action broker application 83 receives the feedback payload from the user interface widget 70, which may include the unique identifiers, any page metadata and any responses provided by the user. The action broker application 83 uses this information to create an alert that is transmitted to the ticketing/notification system 90. Before sending the alert, the action broker application 83 may replace the unique identifier with the source file name and any other information that was stored by the input application 81. While the above description describes an interface to the ticketing/notification system 90, the action broker application 83 may integrate with any external system with an interface. For example, the action broker application 83 may interface to reporting software, or a data/metrics aggregator, such as splunk or datadog.

While the input application 81, the rendering application 82 and the action broker application 83 are shown as being part of a single entity, it is understood that these applications may be separate. In that embodiment, each may have access to the table containing the unique identifiers and the associated attributes.

Figure 8:
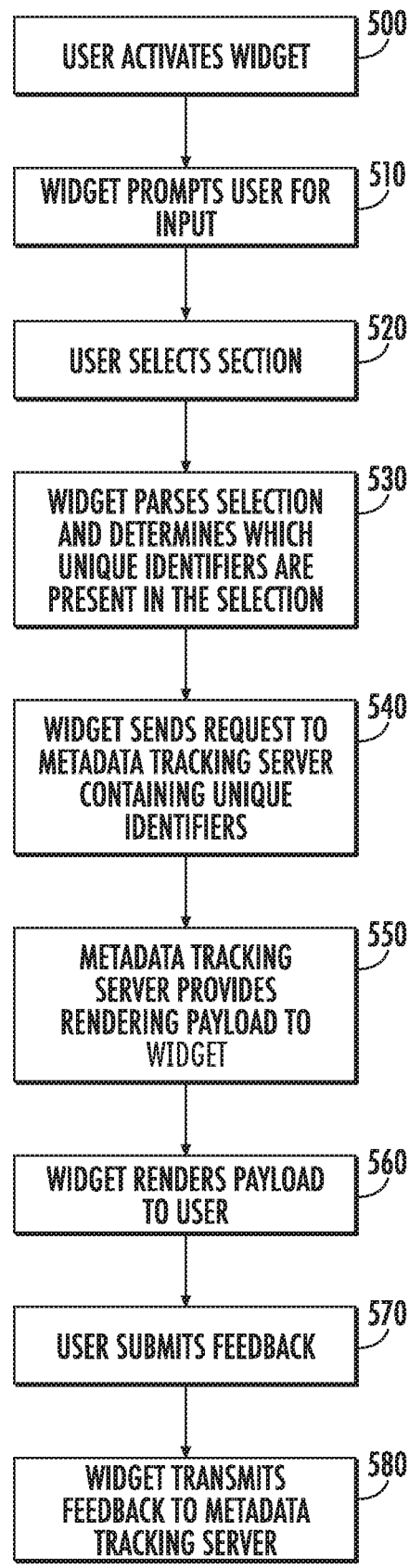
FIG. 8 shows the operation of the user interface widget.

The operation of the user interface widget is shown in FIG. 8. First, as shown in Box 500, the user activates the user interface widget 70. This may be done by clicking a feedback button or icon for example. The user interface widget 70 then prompts the user to select a section of the page that they wish to provide feedback on, as shown in Box 510. In response, the user selects a section of the page, as shown in Box 520. This may be done by highlighting the section using a cursor for example. Once the user has selected the section of the page, the user interface widget 70 parses the user's selection to find any unique identifiers, as shown in Box 530. The user interface widget 70 then passes the request to the metadata tracking server 80, as shown in Box 540. This request includes the unique identifiers that were contained in the selection. In response, the metadata tracking server 80 transmits a rendering payload to the user interface widget 70, as shown in Box 550. As shown in Box 560, the user interface widget 70 then renders this payload, which in certain embodiments, may be a form requiring input from the user. The user then enters the requested information, as shown in Box 570. Finally, the user interface widget 70 passes this response to the metadata tracking server 80, and more specifically the action broker application 83, as shown in Box 580.

The following describes the operation of the system when a reviewer identifies an error in the documentation.

In this example, the reviewer is a tech writer reviewing documentation and finds a mistake on https://docs.silabs.com/my-docs/2.0/main/zeds2-docs/input-spec. A portion of this web page is shown in FIG. 9. The error in this example is that the second heading of the page should be "ZEDS2 Goals:" instead of "Zeds2 Goals:". As the tech writer, the reviewer has access to a special version of the rendered HTML document, where the reviewer can highlight the heading in question and click "Report" and enter a comment. In response, a dialog box, such as the one shown in FIG. 10, is displayed.

The reviewer then enters the comment. In response, the widget collects:
  Who the reviewer is (Tech writer)
  The page the reviewer is flagging (/my-docs/2.0/main/zeds2-docs/input-spec)
  The reviewer's comment (Change to 'ZEDS2 Goals:')
  The element the reviewer selected. (<h2 data-docmeta="b7421625-3bf8-436d-8214-c79d910f9ee5" data-v-5ca27558 data-v-499fe89b>Zeds2 Goals:</h2>)

The element may be retrieved by querying the compiled final output document, an example of which is shown in FIG. 11. In this example, the element-id was the hash that was inserted by the source metadata tagger and document compiler 40.

Having that information, widget then does a POST to the Action Broker application 83.
  POST https://docs-report.silabs.com/api/v1/report
  POST data:
  {
    "user": "user-id",
    "page": "/my-docs/2.0/main/zeds2-docs/input-spec",
    "element-id": "b7421625-3bf8-436d-8214-c79d910f9ee5",
    "comment": "Change to 'ZEDS2 Goals:'"
  }
  Based on the page in the post, the Action Broker API determines the page being read is
  docset my-docs
  version 2.0
  at location main/zeds2-docs/input-spec Once the hash is retrieved, the system uses the hash found above to query the metadata tracking server 80. The metadata tracking server 80 then returns the location of the source file.

The Action Broker Application 83 now has the original source repository, its original source file, and optionally, the position of the exact element in the source.

The Action Broker Application 83 now creates a work ticket pointing to the actual source file in question with the comment "Change to 'ZEDS2 Goals:'"

This work ticket may be forwarded to the responsible person (which may also be contained with the metadata tracking server 80).

Thus, the present system includes several novel software components; a source metadata tagger and document compiler 40, a user interface widget 70 and a metadata tracking server 80. Each of these software components performs one or more functions that are necessary for the ability to automate the software documentation review process. As described above, the source metadata tagger and document compiler 40 inserts metadata into the final output document 50. It is this metadata that make the identifier of the source file in question possible.

In certain embodiments, the entire review process is not automated. Rather, the metadata is inserted into the final output document 50 as described above. This final output document 50 may be reviewed by one or more individuals. The reviewers may identify passages in the final output document 50 that are in error. The individuals may then provide feedback to the software provider, indicating the page number and line number of the error. Since the final output document 50 contains the metadata, the software supplier is able to quickly identify the source file that is being flagged. A work item can then be created and sent to the proper developer for remediation. Thus, in this embodiment, the source metadata tagger and document compiler 40 and the input application 81 of the metadata tracking server 80 are implemented. However, other components, such as the rendering application 82 of the metadata tracking server 80 and the user interface widget 70, may not be present in this embodiment. In other words, in these embodiments, the creation of the final output document, which contains metadata that is representative of the source file associated with the content in the final output document, is sufficient to implement the system.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for creating a documentation set, comprising:
  one or more software or documentation repositories;
  a build system to identify source files in the one or more software or documentation repositories to be included in the documentation set;
  a source metadata tagger and document compiler to create a final output document, the final output document comprising software documentation created using source files from the one or more software or documentation repositories, wherein the source metadata tagger and document compiler inserts metadata into the final output document, the metadata indicative of a location of each source file used to create the final output document, wherein the metadata comprises a one way hash of the location of each source file;

an application widget that is embedded in a viewable version of the final output document, wherein the application widget allows a reviewer to highlight a section of the viewable version of the final output document and to input a text comment; and an Action Broker application, wherein the application widget posts data to the Action Broker application, wherein the data includes the text comment and other metadata; and wherein the Action Broker application creates a work ticket associated with the text comment, wherein the work ticket includes a name of the source file with which the text comment is associated.

2. The system of claim 1, further comprising a metadata tracking server, the metadata tracking server comprises a database comprising each hash and a location of the source file associated with the hash.

3. System of claim 2, wherein the database includes a name of a responsible person associated with each source file.

4. The system of claim 1, wherein the metadata is inserted at the start of content from each source file in the final output document.

5. The system of claim 1, wherein a database is used to determine a responsible person for the source file with which the text comment is associated, and wherein the responsible person is identified in the work ticket.

6. The system of claim 1, further comprising a ticketing/notification system, wherein the work ticket is forwarded to the ticketing/notification system.

7. A method of creating a documentation set, comprising:

collecting source files having documentation from a plurality of disparate sources;

compiling the source files into a final output document, the final output document comprising software documentation, wherein metadata is inserted into the final output document, the metadata indicative of a location of each source file used to create the final output document, wherein the metadata comprises a one way hash of the location of each source file;

creating a viewable version of the final output document;

allowing a reviewer to highlight a section of the viewable version of the final output document and to input a text comment; and creating a work ticket, using an application, based on the text comment and other metadata, the work ticket containing the location of the source file that is being highlighted.

8. The method of claim 7, further comprising creating a database that correlates the hash with the location of each source file.

9. The method of claim 8, wherein the database includes a name of a responsible person associated with each source file.

10. The method of claim 7, wherein the metadata is inserted at the start of content from each source file in the final output document.

11. The method of claim 7, wherein a database is used to determine a responsible person for the source file with which the text comment is associated, and wherein the work ticket is forwarded to the responsible person.

* * * * *